(No Model.)
J. A. SCHAUMLEFFEL.
COTTON CHOPPER AND CULTIVATOR.
No. 356,853. Patented Feb. 1, 1887.
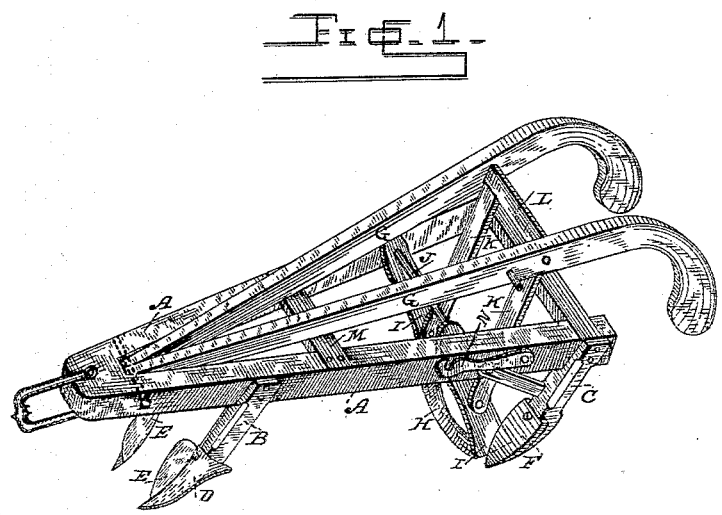
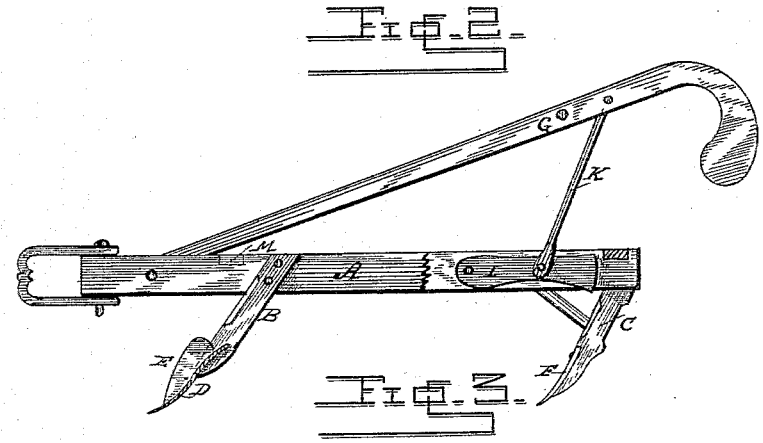
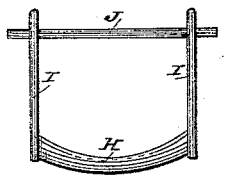
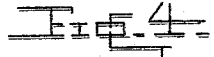
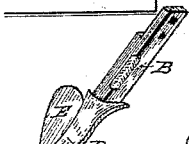
WITNESSES:
Jos H Blackwood
M R Doolittle
INVENTOR:
John A. Schaumleffel
by R. G. Du Bois & Co
his Attorneys

United States Patent Office.

JOHN A. SCHAUMLEFFEL, OF ELM GROVE, TEXAS.

COTTON CHOPPER AND CULTIVATOR.

SPECIFICATION forming part of Letters Patent No. 356,853, dated February 1, 1887.

Application filed September 9, 1886. Serial No. 213,080. (No model.)

*To all whom it may concern:*

Be it known that I, JOHN A. SCHAUMLEFFEL, a citizen of the United States, residing at Elm Grove, in the county of Caldwell and State of Texas, have invented certain new and useful Improvements in Cotton Choppers and Cultivators; and I do hereby declare the following to be a full, clear, and exact description of the invention, such as will enable others skilled in the art to which it appertains to make and use the same.

In the culture of cotton the seed is thickly planted in continuous drill-rows, and after the plants come up the rows are gone over and the superfluous plants chopped out at certain intervals, thus leaving them to complete their growth in hills. The majority of the seed sown does not come up, and there are, consequently, bare spaces left in the rows. Sometimes only one plant will spring up, leaving upon either side thereof a space of several feet, and it is desirable to leave this isolated plant standing.

The cotton-choppers most commonly used employ revolving chopping-knives, which revolve intermittently; but such machines are as liable to cut down the single standing plants as they are to cut out the superfluous ones; and the object of my device is to obviate this difficulty by providing a chopper in which the blade can be operated by the driver and any desired amount of cotton cut out of the row at pleasure; and a further object is to provide a simple, cheap, and durable machine which will come within the reach of planters of moderate means; and to this end my invention consists in the mechanism more fully described hereinafter, and pointed out in the claims.

Referring to the accompanying drawings, Figure 1 represents a perspective view of my complete device, showing the chopping-knife in the position it assumes when scraping the ground in the act of chopping out the cotton between the hills; Fig. 2, a side elevation illustrating the chopper raised to clear those plants which are to be left standing; Fig. 3, a detail front view of the curved transverse chopping-knife, and Fig. 4 a detail view illustrating one of the front stocks and share detached.

Like letters represent corresponding parts throughout the different views.

A represents an ordinary triangular frame provided with a pair of fore stocks, B, and aft stocks, C. The fore stocks, B, are provided with shares D, having wings E, which flare outward, and the aft stocks are provided with teeth F of ordinary pattern. A pair of guiding-handles, G, are pivoted in the front part of the frame A, with their free ends extending over the back thereof in the usual manner. Operating within the frame there is a transverse chopping-blade, H, which is curved downwardly, in order to more deeply enter the earth at its central portion. Said blade is secured to the ends of arms I, hinged to a cross-rod, J, secured in the beams forming the sides of the frame A.

K are a pair of links, which connect the handles G with the chopper. One end of these links is pivoted to the knife-arms I and the opposite end to a cross-bar, L. The downward movement of the handles is limited by the cross-bar M, secured transversely across the forward part of the frame A in such a manner that the lower side of the handles will rest upon its upper side. The handles G are held down by means of the locking-hooks N, hinged to the side of the frame A and engaging with the pins O, projecting from the handles.

It will be observed that the connecting-links K, between the handles and chopping-knife, are pivoted to the knife-arms I below the pivotal point of said arms and above the free ends thereof, to which the chopping-blade is secured.

The object and nature of my device having been set forth, I will now proceed to describe its operation.

The cultivator is placed astride a row of cotton, and as it advances the fore shares, D, plow up the earth close to the row, and the wings E prevent the earth from being thrown against the plants. When the handles G are depressed, the cutting-blade skims the ground and removes the superfluous plants, being raised at suitable intervals, as shown in Fig. 2, to skip those plants which are to compose the hills. Thus it will be seen that by simply raising and lowering the vertically-operating chopping-knife H while the cultivator is advancing any desired number of plants can be removed or left standing.

A very valuable feature of my device is that it can be used to great advantage for cultivating purposes after the chopping has been completed, and this may be accomplished by transposing the parts, putting the teeth F of the aft stock upon the fore stocks, B, and the right-hand share upon the left aft stock, C, and the left-hand share upon the right aft stock. After thus transposing the parts, remove the transverse chopping-blade and fasten the pivoted handles G down by means of the hooks and pins.

It is evident that my device could be varied in many ways which might suggest themselves to a skilled mechanic. Therefore I wish it understood that I do not herein limit myself to the precise construction shown, but consider myself entitled to all such variations as come within the scope of my invention.

Having thus described my invention, what I claim as new, and desire to secure by Letters Patent, is—

1. The combination, in a cotton cultivator and chopper, of the usual frame, a pair of guiding-handles pivoted thereto, a chopping-knife hinged to said frame, and links forming a loose connection between said blade and handles, whereby the blade is raised and lowered, substantially as described.

2. The combination, in a cotton chopper and cultivator, of the usual frame, the guiding-handles pivoted thereto, hinged arms carrying a chopping-knife, links loosely connecting said handles with said arms, and the stocks provided with shares, all arranged and adapted to operate substantially as described.

3. The combination, in a cotton chopper and cultivator, of the usual frame, the fore stocks having shares provided with outwardly-flaring wings, the aft stocks provided with teeth, substantially as shown, the pivoted transverse chopping-blade located between the front and rear shares, the pivoted handles, and connecting-links, whereby said blade is vertically operated, all arranged and adapted to operate as described.

4. The combination, in a cotton chopper and cultivator, of the usual frame, the fore stocks provided with shares having outwardly-flaring wings, the aft stocks provided with teeth, substantially as shown, the handles pivoted to the fore part of the frame, the hooks and pins for holding said handles down, and the cross-bar for limiting their downward motion, the vertically-operating chopping-blade, and the links connecting the arms of said blade with said handles, all arranged and adapted to operate in the manner and for the purpose substantially as described.

In testimony whereof I affix my signature in presence of two witnesses.

JOHN A. SCHAUMLEFFEL.

Witnesses:
J. R. JACKSON,
W. R. SMITH.